United States Patent [19]
Roxlo et al.

[11] Patent Number: 4,867,840
[45] Date of Patent: Sep. 19, 1989

[54] METHOD OF MAKING ARTIFICIALLY TEXTURED LAYERED CATALYST

[75] Inventors: Charles B. Roxlo, Bridgewater; Harry W. Deckman, Clinton, both of N.J.; J. Thomas Tiedje, Vancouver, Canada

[73] Assignee: Exxon Research and Engineering Company, Florham Park, N.J.

[21] Appl. No.: 174,723

[22] Filed: Mar. 29, 1988

Related U.S. Application Data

[63] Continuation-in-part of Ser. No. 863,864, May 16, 1986, abandoned.

[51] Int. Cl.⁴ .................... B01J 27/00; B01J 37/00
[52] U.S. Cl. ........................ 156/643; 156/646; 156/656; 156/659.1; 502/439; 502/514
[58] Field of Search ............. 156/643, 646, 647, 656, 156/659.1; 502/219, 220, 439, 502, 514, 527

[56] References Cited

U.S. PATENT DOCUMENTS

| | | | |
|---|---|---|---|
| 3,966,644 | 6/1976 | Gustafson | 502/220 X |
| 4,268,347 | 5/1981 | Stephens | 156/643 X |
| 4,407,695 | 10/1983 | Deckman et al. | 156/643 |
| 4,608,319 | 8/1986 | Croopnick et al. | 156/656 X |
| 4,755,496 | 7/1988 | Ho et al. | 502/220 XR |

OTHER PUBLICATIONS

Tributsch, "Photoelectrical Behavior of Layer-Type Transition Metal Dichalcogenides", pp. 189-205, (Received 19th May, 1980).
Goldberg et al., "The Low-Energy Absorption Edge in 2H-$MoS_2$ and 2H-$MoSe_2$", Phil. Mag. 32, pp. 367-378, (1975).
Olmstead et al., "Direct Measurement of the Polarization Dependence . . . ", Physical Reveiw Letters, vol. 52(13), pp. 1148-1151, (1984).
Voorhoeve et al., "Tungsten Sulfides Obtained by Decomposition of Ammonium Tetrathiotungstate", Z. Anorg. Allg. Chem. 376, 165-179, (1970).
Liang et al., "UPS Investigation of Poorly Crystallized $MoS_2$", J. Vac. Sci. Technol. A, vol. 2(2), Apr.-Jun. 1984, pp. 991-994.
Cody, "The Optical Absorption Edge of a-Si:H", Semiconductors and Semimetals, vol. 21, Part B, pp. 11-82, (1984).
Stupp, "Synergistic Effects of Metals Co-Sputtered With $MoS_2$", Thin Solid Films, 84, pp. 257-266, (1981).
Boudart et al., "Study by Synchrotron Radiation of the Structure of a Working Catalyst . . .", Science, vol. 228, pp. 717-719, (10 May 1985).
Jackson et al., "Optical Absorption Spectra of Surface or Interface States in Hydrogenated Amorphous Silicon", Appl. Phys. Lett. 42(1), p. 105, (1983).
Jackson et al., "Photothermal Deflection Spectroscopy and Detection", Applied Optics, vol. 20(8), pp. 1333-1344, (15 Apr. 1981).

*Primary Examiner*—David L. Lacey
*Assistant Examiner*—Andrew J. Anderson
*Attorney, Agent, or Firm*—Ronald D. Hantman

[57] ABSTRACT

A method for making a layered metal chalcogenide catalyst wherein the catalyst has a crystalline structure with increased edge sites produced by lithographic methods.

10 Claims, 12 Drawing Sheets

METHOD OF MAKING ARTIFICIALLY TEXTURED LAYERED CATALYST

CROSS REFERENCE TO RELATED APPLICATIONS

This application is a continuation-in-part application of copending Ser. No. 863,864, filed May 16, 1986, now abandoned.

BACKGROUND OF THE INVENTION

The present invention relates to layered catalysts having increased catalytic activity and a method for making them. In particular, the invention relates to metal chalcogenide catalysts.

The structural nature of the layered transition metal dichalcogenides is intimately related to their practical uses. The layered transition metal dichalcogenides have applications in areas as diverse as lubrication (B. R. Stupp, Thin Solid Films 84, 257 1981), catalysis (M. Boudart, R. A. Dalla, K. Feger, D. G. Loffer, M. G. Samant, Science, 228,717, 1985) and electrochemistry (H. trbutsch, Faraday Discuss. Chem. Soc. 70, 190, 1981). Thus, the lubricity of $MoS_2$ stems from the weak bonding between adjacent basal planes. The intercalative properties of $TiS_2$, which has been exploited in nonaqueous battery applications are likewise the consequence of the weak interlayer forces, Whittingham, M. S., Science 192, 1126 (1976).

Another important application of transition metal dichalcogenides occurs in the area of heterogeneous catalysis. $MoS_2$ and, to a lesser extent $WS_2$ are the active components in catalysts currently in largescale use for the removal of sulfur and nitrogen from a variety of petroleum feedstocks. It is widely believed (see, e.g., S. J. Tauster, T. A. Pecoraro, and R. R. Chianelli, J. Catal. 63, 515 (1980)) that the catalytically active sites are located at the edges of the crystal planes in this two-dimensional material. Usefulness of these materials results from their highly anisotropic structure, in which tightly bound two-dimensional layers are held together by weak van der Waals forces between layers. Single crystals of these materials have two types of surfaces that have very different characteristics. Basal plan surfaces are parallel to the layers; edge surfaces are perpendicular. The basal surfaces contain sulfur atoms that are bound to three metal atoms. The sulfur atoms provide physical adsorption sites for intercalates but are otherwise chemically inert. On the other hand, the edge surfaces can be formed only by breaking bonds within the layer and have been shown to be chemically and catalytically active. The structure of these edge surfaces, which lies at the heart of the chemical properties of these materials, is poorly understood at present.

The catalytic properties of these materials are usually observed with highly disordered powders, instead of with either crystalline or microcrystalline materials. This is because conventional crystal growth techniques yield materials with relatively low edge area because growth occurs primarily in the direction parallel to the layers. A well-ordered edge surface is difficult to create by cutting or polishing because the layers fold and break irregularly. The present invention is a new way of preparing chemically reactive surfaces with lithographic fabrication methods. Single crystals of $MoS_2$ prepared in this way have a surface that consists primarily of edge planes, which allows exceptional control of the surface morphology.

SUMMARY OF THE INVENTION

The present invention includes layered catalysts and a method for making them such that the catalysts show increased catalytic activity. This is achieved by increasing the edge sites of the materials in a controlled manner. In a preferred embodiment, the catalysts include metal chalcogenides such as $MoS_2$, $ReS_2$, and $WS_2$. The structures have a surface dominated by these edge sites, but maintain a crystalline structural backbone. These structures have lithographically (described below) defined pores with sizes which can be changed easily over a wide range. A high level of midgap optical absorption is observed, indication of catalytic activity.

DESCRIPTION OF THE PREFERRED EMBODIMENT

For purposes of description, the present invention shall be illustrated and described with reference to $MoS_2$.

With $MoS_2$, we have shown that the catalytically active edge sites have a distinct optical adsorption spectrum. In section I, we will demonstrate the correlation of the optical adsorption spectra with catalytic activity. This correlation will be demonstrated for $MoS_2$ materials in the form of platelets and powders. The platelets are highly crystalline and have highly ordered edge surfaces, while the powders contain a disordered crystalline structure.

Section II describes a lithographic technique which can be used to prepare microstructures with a large and controllable density of edge sites. The technique described in Section II is but one on many lithographic techniques which could be used to prepare microstructures.

Section III describes what happens when the lithographic method described in section II is applied to texturing metal calcogenides. In particular, it is shown that optical adsorption spectrum characteristic of edge sites is obtained. These edge sites are on a highly ordered crystalline surface. This differs from edges on highly disordered (or poorly crystalline/amorphous powders). The organization of and character of the edge site is similar to that obtained for crystalline platelets. (Section IE). As such, the lithographic technique produces a controllable density of catalytically active edge sites with a high degree of order. The ability to lithographically produce large densities of highly ordered edge sites is quite unanticipated in the prior art. Moreover, we can controllably alter the highly ordered edge sites by post-treating samples with $H_2/H_2S$, HCl, $NH_4$, .... These treatments controllably alter the ordering of edge sites and alter catalytic selectivity in a predetermined manner.

I. Optical Absorption and Catalytic Activity of Edge Surfaces for Metal Chalcogenides Such as $MoS_2$ As discussed above, the active sites in $MoS_2$ probably lie on the edge planes (100); the basal planes (002) are quite inert. Experimental evidence for this idea comes from several studies on unsupported $MoS_2$ catalysts, see, e.g., R. R. Chianelli, Catal. Rev.-Sci. Eng., 26 (3&4), 361-393 (1984); R. R. Chianelli, Inter. Rev. Phy, Chem., 2, 127-165 (1982); S. J. Tauster, T. A. Pecoraro, and R. R. Chianelli, J. Catal. 63, 515 (1980); and R. R. Chianelli, A. F. Ruppert, S. K. Behal, A. Wold, and R. Kershaw, J. Cat. 92, 56-63 (1985).

In addition, the sites on the active edge planes have well-defined optical characteristics. A midgap optical absorption is observed similar to that observed from other semiconductor defects. This absorption is proportional to the catalytic site density in disordered powders providing a direct correlation between the electronic structure of these materials and their catalytic properties. These measurements can be applied to the lithographically textured material to calculate edge site density and catalytic activity. Additionally, HDS activity measurement are presented on $MoS_2$ micro-crystallites whose edge area is well defined and directly measurable from SEM micrographs. These measurements allow us to calculate an edge area turnover number for $MoS_2$ and relate the optical absorption data directly to the $MoS_2$ edge planes. The data shows that edge sites in amorphous and crystalline $MoS_2$ have very similar optical and catalytic properties. These measurements can be applied to the lithographically textured material to calculate edge site density and catalytic activity.

I (a) Preparation of Platelets

Molybdenum sulfide micro-crystal were grown by chemical vapor transport from $MoS_2$ powder (Alpha Ventron reagent grade). The starting material was placed with an excess of sulfur in one end of an evacuated quartz tube at 690° C.; the opposite end was kept at 545° C. This process yielded "small" single crystals roughly hexagonal in shape with diameters ($\sim 1$ $\mu$m) roughly ten times larger than thickness. These platelets were then reheated at 1100° C. for 3 weeks to obtain much larger ($\sim 30$ $\mu$m) diameters. This material was sifted through a mesh with $\sim 140$ $\mu$m hole size to eliminate the larger clumps of material.

I (b) Preparation of Powders

The $MoS_2$ powders were prepared by the thermal decomposition of $(NH_4)_2 MoS_4$ in $N_2$ at 250° C. The resultant material was separated into batches which were annealed in 15% $H_2S/H_2$ for 2 hours at temperatures ranging from 400° C. to 900° C. Scanning electron micrographs of the powders showed what appeared to be platelets and needles between 20 and 100 um long. The size distribution was independent of the anneal temperature, consistent with the previous observation that the $MoS_2$ crystals are pseudomorphic with the $(NH_4)_2MoS_4$ precursor, see, e.g., R. J. H. Voorhoeve and H. B. M. Wolters, Z. Anorg. Allg. Chem. 376, 165 (1970).

1 (c) Ootical Measurements

Figure 1:
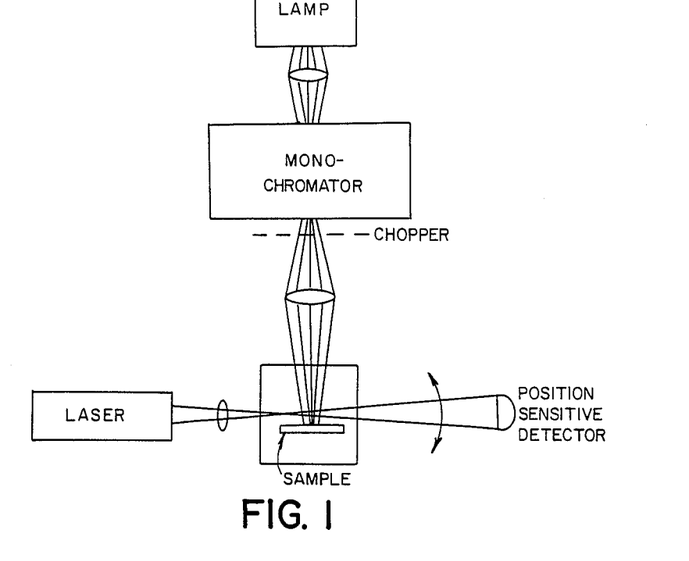
FIG. 1 shows a schematic diagram of the Photothermanl Deflection Spectroscopy arrangement.

The infrared optical absorption was determined using Photothermal Deflection Spectroscopy (PDS), see, e.g., W. B. Jackson, N. M Amer, A. C. Boccara, and D. Fournier, Appl. Opt. 20, 1333 (1981). This is a calorimetric technique which directly measures the absorption in the sample using the deflection of a laser beam (FIG. 1). It is insensitive to optical scattering and thus ideal for powders, particularly if they are black as in the present study. The sample was distributed on a quartz substrate and immersed in a solvent, which was either carbon tetrachloride or heptane. The output of a 1 KW xenon arc lamp was dispersed in a grating monochromator and chopped at 15 Hz before illuminating the sample. The light absorbed by the sample caused a small ($>10^{-6}$K) temperature rise in the adjacent solvent. The accompanying change in index of refraction deflected a He-Ne laser beam grazing the surface of the sample. This deflection was monitored by a position sensitive detector and processed using a lock-in amplifier and computer.

Care was taken to ensure that the material was evenly distributed on the substrate and that the $MoS_2$ particles were well separated. Only a small fraction (<20%) of the substrate area was covered, to ensure that light scattered from one particle was not absorbed in another. In the case of the amorphous powders, the size distribution was the same for all the samples studied, so that measured absorption can be directly compared. Several runs were averaged at each anneal temperature to produce the data shown here.

PDS spectra were taken over a range of 0.7–2.5 eV (0.5–1.8 μm). From 1.8 to 2.5 eV, where there is a strong excitonic absorption, the absorption was a constant due to saturation. Normalizing this signal level to unity, the absorption (i.e., the fraction of photons incident on the MoS$_2$ which are absorbed) is determined at all energies. The absorption A can be related to the defect density N and absorption cross-section $\sigma$ by $A = 1 - 3^{-N\sigma l}$, where l is the average particle thickness.

I (d) Catalytic Activity

Catalytic activity was determined using the hydrodesulfurization of dibenzothiophene in a manner previously reported. The reaction was performed using roughly 1 g of catalyst in a batch reactor for 8 hours at 350° C. at 3150 KPa H$_2$ using a 5 wt. % DBT in 100 ml decalin feed. In some cases the catalytic activity was observed to change after several hours; therefore the initial activity was used for comparison to optical measurements taken before the run.

I (e) Results-Platelets

Figure 2:
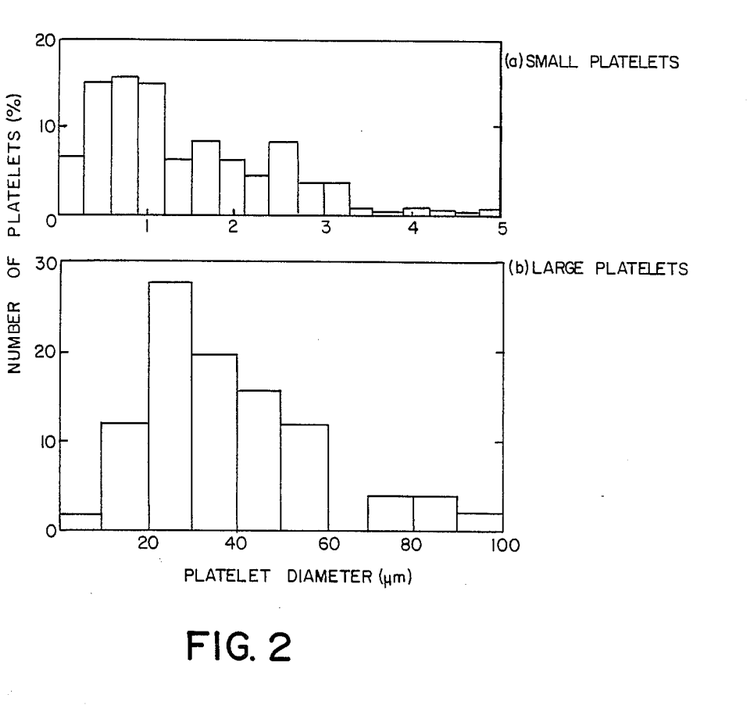
FIG. 2 shows histograms of the size distribution in the $MoS_2$ platelets.

The single crystal MoS$_2$ platelets were analyzed microscopically in order to estimate the area of the edge planes. A number of such micrographs were analyzed to generate the platelet diameter histograms shown in FIG. 2. From this data we derived a mean platelet diameter of 1.7 μm for the small platelets and 36 μm for the large ones. Using the entire histogram, we can calculate the total edge plan area per gram of catalyst. Assuming that a platelet has a cylindrical shape, the edge area is $$A = \pi D t$$

where D is the platelet diameter and t is the platelet thickness. The mass of the same platelet is $$M = \frac{1}{4} \pi D^2 t \rho$$

where l is the density of crystalline MoS$_2$. The micrographs indicate that the platelet thickness is proportional to the diameter. Assuming this to be true, the total edge area per unit mass of catalyst is simply $$\frac{<A>}{<M>} = \frac{4}{\rho} \frac{<D^2>}{<D^3>}$$

where $<...>$ indicates the average value taken over the histograms of FIG. 2. Note that this result is not the same as that obtained if it is assumed that all the platelets have the mean diameter.

For convenience in calculating turnover numbers, we wish to calculate the number of Mo atoms exposed on the edge plane. This is done by dividing the edge plan area by the area of MoS$_2$ molecular unit ($2.0 \times 10^{-15}$ cm$^2$). The "edge site" density thus calculated is $6.1 \times 10^{17}$ sites/gm for the small platelets and $7.2 \times 10^{16}$ sites/gm for the large ones.

Figure 3:
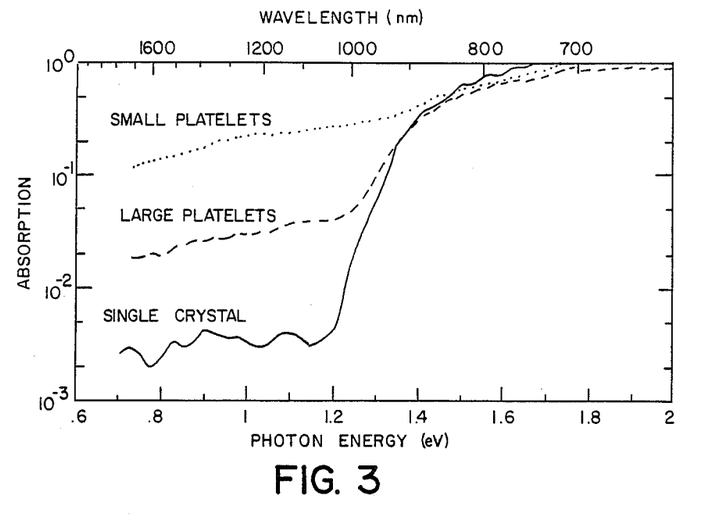
FIG. 3 shows the Photothermal Deflection Spectroscopy absorption spectra of the platelets, as well as that of a macroscopic $MoS_2$ single crystal 5.2 $\mu m$ thick. The small platelet spectrum has been shifted upward to account for its smaller thickness.

The optical spectra of these materials is shown in FIG. 3. Also shown for comparison purposes is the absorption spectrum of a 5.2 μm thick single crystal of millimeter transverse dimensions. The absorption band beginning at 2 μm and increasing toward higher energies is due to the indirect bandgap, see, e.g., A. M. Goldberg, A. R. Beal, F. A. Levy and E. A. Davis, Phil. Mag. 32, 367 (1975). Strong excitonic absorption at 1.8 eV saturates the absorption for higher energies. The flat lower energy absorption in the single crystal is from defects in the material and varies strongly from sample to sample.

The spectrum of the large platelets is seen to be very similar to the single crystal, except that the defect absorption below 1.2 eV is an order of magnitude higher in the platelets. The striking similarity of the two curves between 1.3 and 1.6 eV shows that the large platelets are indeed single crystals with an average thickness of $5 \pm 1$ μm, because the magnitude of this absorption agrees with that of the 5 μm thick single crystal.

The absorption spectrum of the smaller platelets is also shown as the upper curve in FIG. 3. This curve cannot be directly compared to the large platelets because the average sample thicknesses are different. This was accounted for in FIG. 3 by multiplying the small platelet curve by a constant factor of 2 to normalize to the others at 1.5 eV. Because the absorption at this energy is due to the bulk semiconductor, this normalization accounts for the difference in sample thickness so that the low-energy absorption is proportional to the defect density. The low energy absorption is an order of magnitude greater in the small platelets than it is in the large ones, in good agreement with the greater density of edge sites.

From this data it is evident that the optical absorption observed below 1.2 eV in the platelets is due to the exposed edge planes. "Dangling bonds", vacancies or other similar surface defects would be expected to have electronic states in mid-gap and thus increase the optical absorption in this region. From the known density of edge sites we can calculate the average optical absorption of a single edge site. The answers obtained from the data of FIG. 10 (at 0.8 eV) are $6.1 \times 10^{-17}$ cm$^2$ for the small platelets and $8.4 \times 10^{-17}$ cm$^2$ for the large ones. The agreement between these two numbers is excellent considering the approximations going into the diameter calculations and shows that the low-energy absorption is indeed proportional to the edge plane area.

It is reasonable to ascribe the very low level of absorption observed in the macroscopic crystal to similar edge defects at grain boundaries in the bulk of the material. This absorption was observed to be proportional to the crystal thickness over more than an order of magnitude, showing that it is a bulk effect. The low absorption coefficient (5 cm$^{-1}$) corresponds to a defect density of $7 \times 10^{16}$ cm$^{-3}$. This is consistent with our knowledge of these crystals, although we have not directly measured the defect density and it is difficult to eliminate the possibility of impurities at the part per million level. It is possible that part of this absorption is due to the exposed basal plane surface. However, even if all of the absorption we have observed in a thin (0.5 μm) sample were due to these surfaces, the absorption cross-section of an exposed basal plane site would still be only $10^{-19}$ cm$^2$. This is more than two orders of magnitude smaller than we have observed from the exposed edge sites. The fact that we fail to observe optical activity from the basal surfaces is consistent with the chemical inactivity of these planes. Further study is necessary to understand the electronic structure of basal planes and other defects in MoS$_2$ single crystals.

Figure 4:
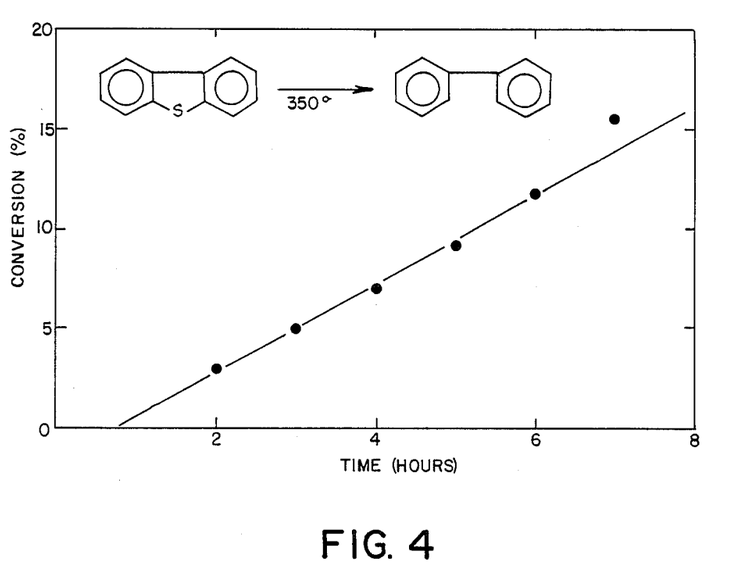
FIG. 4 shows the catalytic conversion of Dibenzothiophene into Biphenyl observed on the small platelets.

FIG. 4 shows the catalytic conversion of dibenzothiophene measured on the small platelets. Biphenyl was the only product observed; no hydrogenation occurred on the crystalline materials. The slope gives a hydrodesulfurization activity of $R=4.8\times10^{16}$ molec/g-sec. From this and the density of edge sites in this material we can calculate the turnover frequency to be $7.9\times10^{-2}$ molecules/site-sec. This calculation assumes that each exposed Mo atom is catalytically active; it is, of course, possible that only a fraction of the edge sites is active in which case the appropriate turnover number would be higher.

I(f) Results-Powders

Figure 5:
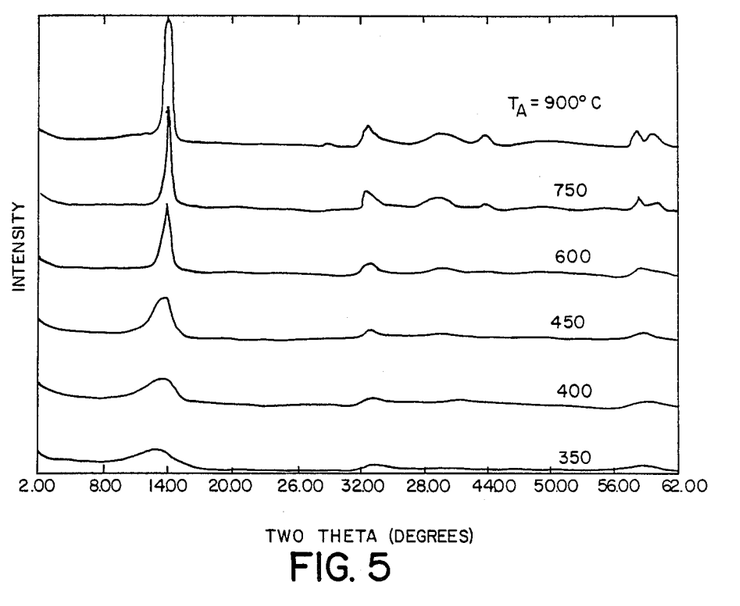
FIG. 5 shows X-ray diffraction patterns observed from the disordered $MoS_2$.

X-ray diffraction patterns for the $MoS_2$ powders are shown for several anneal temperatures in FIG. 5; these results are typical for poorly crystalline MoS2. It is clear that higher anneal temperatures yield more crystalline material; the decrease in the (002) line width shows that the layer stacking increases dramatically.

Figure 6:
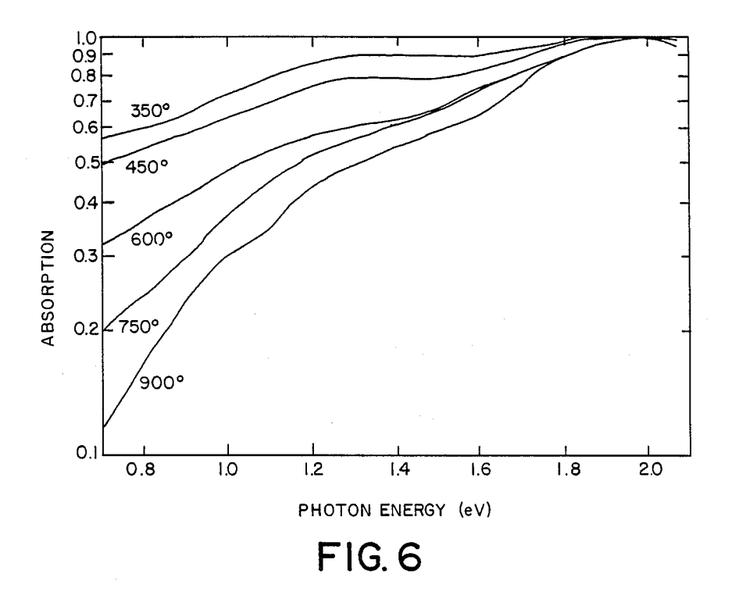
FIG. 6 shows optical absorption spectra of the $MoS_2$ powders.

The optical absorption spectra of these materials is shown in FIG. 6. We observe a strong, broad absorption tail below the band-to-band absorption which is dependent on the anneal temperature. This absorption is very similar to that observed from edge plane defects in the platelets with a slight difference in shape which will be discussed below.

The above spectra were taken in carbon tetrachloride on samples which were air-oxidized at room temperature. We also performed experiments on samples which had not been exposed to oxygen. The powders were mounted in air-tight PDS cells and treated in $H_2S/H_2$ at 350° C. for 2 hours to sulfide the surface. The cells were filled with distilled spectral grade heptane and sealed in a glove box. A small (<20%) increase was observed in the PDS absorption relative to the oxidized samples. Oxygen is known to react with the edge sites, see, e.g., K. S. Liang, G. J. Hughes and R.R. Chianelli, J. Vac. Sci. Tech. A2, 991 (1984). The relatively small change observed upon oxidation might be due to the fact that not all of the defects seen optically lie on the surface; edge-like defects in the bulk of the material could be inaccessible to oxygen. Alternatively, it is possible that the oxide formed in these materials also absorbs in the infrared.

Figure 7:
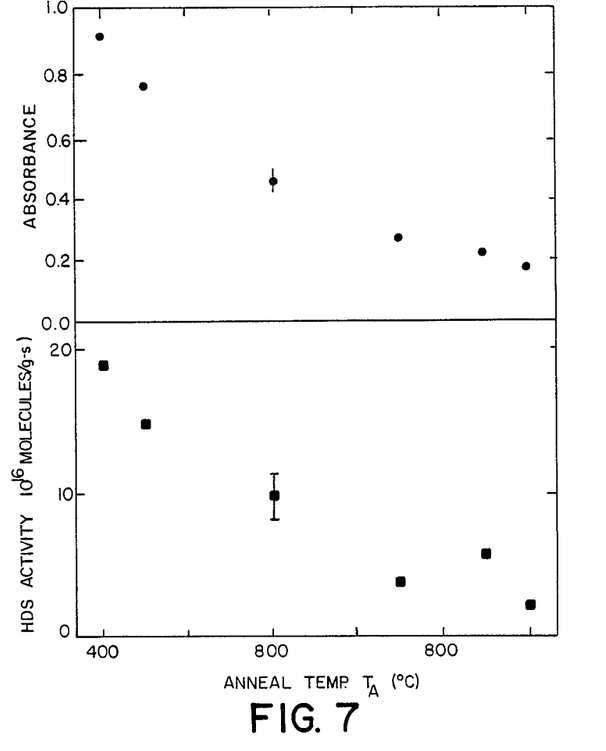
FIG. 7 shows optical absorbance at 0.8 eV and hydrodesulfurization activity versus anneal temperature for the powders.
Figure 8:
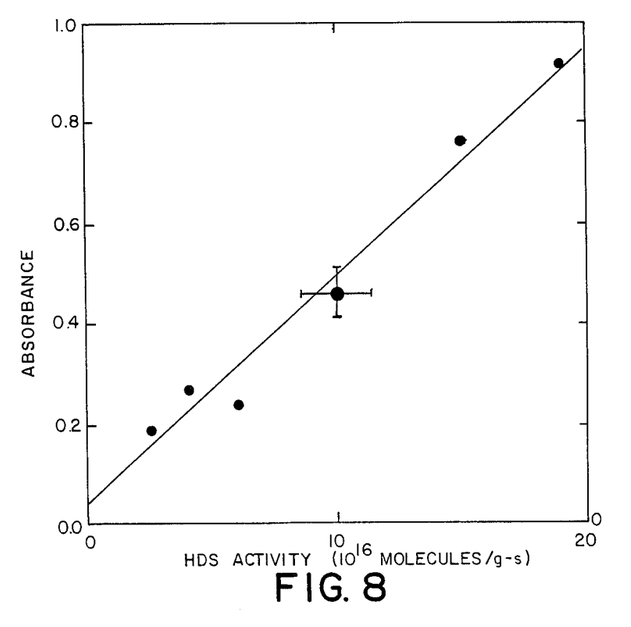
FIG. 8 shows correlation between the optical absorbance and catalytic activity. The line is a least-squares fit to the data points.

In FIG. 7 we plot the absorbance at 0.8 eV ($=1$ n (1-A), where A is the absorption from FIG. 6), against the anneal temperature. Also shown is the total hydrodesulfurization activity observed. This activity is plotted directly against the absorbance in FIG. 8. The line is a least-squares fit to the data points. An excellent fit is observed going through the origin, confirming a direct correlation between the optical absorption and the catalytic activity. Given the similarities to the platelets, we attribute the optical absorption to edge site defects. Assuming that the absorption cross-section is the same in both materials, the turnover frequency calculated from the slope of the line in FIG. 8 is $3(\pm1)\times10^{-2}$ molec./site-sec. This value is 2x lower than that obtained from the platelets, an agreement which is reasonable given uncertainties in the size and density of the disordered material.

I (g) DISCUSSION

The similarity in turnover frequency between the disordered and micro-crystalline materials indicates that the active sites for desulfurization in each are similar and are located on the edge surfaces. Optical absorption due to similar surface and bulk defects has been studied in more conventional crystalline semiconductors, see, e.g., M. A. Omstead and N. Amer, Phys. Rev. Lett. 52, 114B (1984), and amorphous, see, e.g., G. D. Cody in *Hydrogenated Amorphous Silicon*, ed. by J. Pankove, Academic Press (1984) and W. B. Jackson, D. K. Biegelson, R. J. Nemanich and J. C. Knights, Appl. Phys. Lett. 42, 105 (1983). Such defects, particularly those which are catalytically active, would generally be expected to have high energy levels lying between the conduction and valence bands and thus absorb photons with below bandgap energies. This is indeed the behavior observed, and the $10^{-16}cm^2$ cross-section observed is typical of such defects.

A broadening of the valence band edge in poorly crystalline $MoS_2$ materials has previously been observed in Ultraviolet Photoemission Spectroscopy (UPS). The effect there is barely resolvable due to the relatively poor energy resolution of this technique. Those observations are consistent with the optical measurements observed here and show that the defects are close to the valence band and below the Fermi level. Interestingly, the UPS signal was shown to be decreased significantly upon brief exposure to oxygen. Because the oxygen chemisorption has been related to activity, this implies that these tail states are chemically and catalytically active. However, because of the small escape depth for photoemitted electrons, UPS only observes states near the surface. The fact that the PDS data is less sensitive to oxygen might be due to a significant fraction of the absorbing sites being away from the surface and unaccessible to oxygen. A similar effect is observed in the ESR spin density, which is also insensitive to oxygen.

Therefore, we have shown that HDS catalytic activity for unsupported $MoS_2$ platelets and powders is directly correlated with the density of edge surface sites. These sites have a characteristic optical absorption in the near infrared. The turnover frequency of hydrodesulfurization of DBT is roughly $5\times10^{-2}$ molecules/sites-s in both amorphous and crystalline materials.

II. Natural Lithography

Natural lithography may be used to fabricate microstructures over large areas. For lithographic patterning, a mask is deposited on the surface of the catalyst material with a pattern which defines the shapes to be created. The pattern is transferred from the mask into the underlying material by differentially etching the material with respect to the mask. This process divides the material into individual particles whose lateral dimensions are determined by the geometry of the mask. For example, the film can be divided into cylindrical posts by using a sub-monolayer of spherical colloidal particles as an etch mask (Natural Lithographic Fabrication of Microstructures Over Large Areas, H. W. Deckman and J. Dunsmuir, U.S. Pat. No. 4,407,695). Diameter of the resulting post is determined by the colloidal particle diameter and the directionality of the etch used to transfer the pattern on the surface of the film. If the pattern transfer is from an anisotropic etch, the diameter of the resulting post will closely correspond to that of the particulate etch mask. Anisotropic etches which can be used to faithfully transfer the pattern of the spherical mask include ion beam etching and directional reactive ion etching with the plasman.

III. Texturing Metal Chalcogenides

The present invention shall be illustrated with $MoS_2$. It is understood, however, that the invention is not to be limited to these materials.

Figure 9:
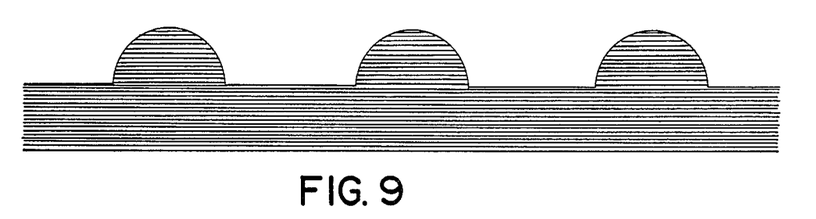
FIG. 9 shows a schematic diagram of one embodiment of the structures after etching.

Films approximately 1 μm in thickness were peeled from bulk samples of naturally occurring molybdenite or synthetic single crystal $MoS_2$ and mounted on quartz substrates. These films have their C axis normal to the surface with virtually no plane edges exposed. The material was textured using the techniques of natural lithography as described above and in U.S. Pat. No. 4,407,695. Monodisperse polystyrene spheres 0.1-1.0 μm in diameter placed on the surface of the film were used as a mask. The film was etched using an argon-ion beam to remove the $MoS_2$ between the balls. An oxygen-ion etch removed any remaining polymer to leave a structure similar to FIG. 9.

Scanning electron micrographs confirmed the sample morphology. We have also taken Transmission Electron Micrographs of the individual posts. These show the individual layers of $MoS_2$, 6A apart, running across the thickness of the post. An enlargement of the post edge, clearly shows the layers and their abrupt termination at the sample surface.

Figure 10:
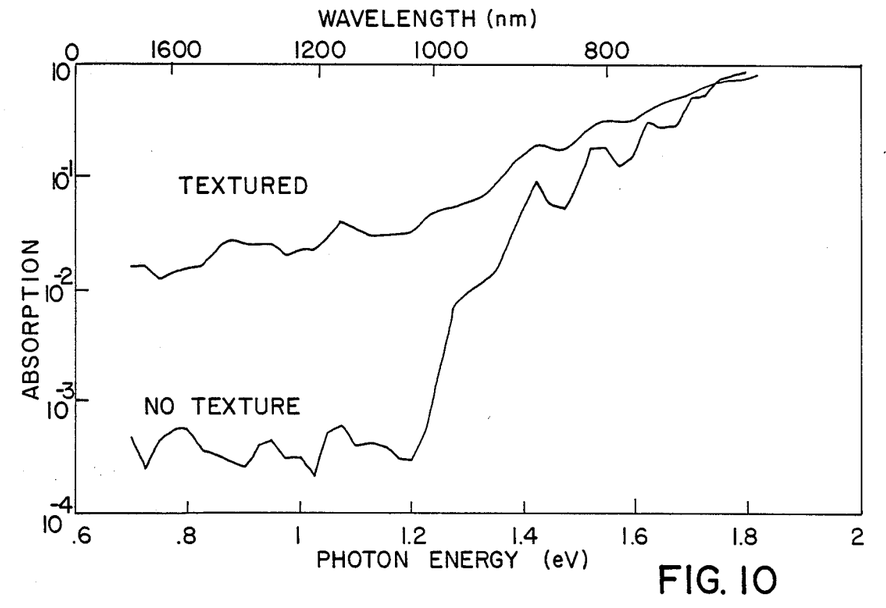
FIG. 10 shows the optical absorption of $MoS_2$ using photothermal deflection spectroscopy.

The optical absorption of the textured materials was measured using Photothermal Deflection Spectroscopy, as described above. FIG. 10 shows the result on a sample of $MoS_2$ which was 0.84 m thick. Before texturing, the absorption is very low, less than $10^{-3}$. The bumps in the spectrum are due to interference fringes. The sample was then covered with 0.2 μm spheres and textured using a 7 min. argon-ion etch and a 3 minute oxygen etch to remove any remaining polymer. The absorption increased by a factor of roughly 100. Such a strong change in the absorption after the removal of material shows that edge sites are being introduced by the texturing process. This change is not observed as strongly if a mask is not used during the etching.

Figure 11:
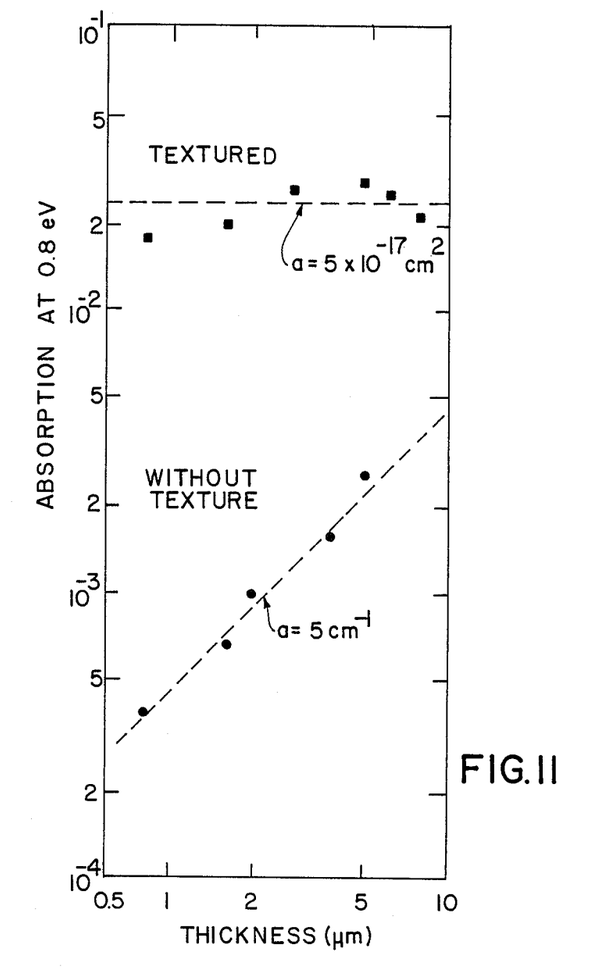
FIG. 11 shows optical absorption for textured and non-textured $MoS_2$ samples as a function of thickness.

This process was performed on a number of samples of differing thicknesses. The absorption of 0.8 eV was proportional to the thickness before texturing, as shown in FIG. 11. This shows that this optical activity is due to defects in the bulk of the crystal. After texturing, the absorption increased dramatically for all samples, to the level of $2 \times 10^{-2}$. This absorption is independent of sample thickness, showing that it is indeed a surface effect.

The shape of the sub-bandgap absorption in the textured material (FIG. 11) is the same as that observed on the platelets (FIG. 3). This confirms that both are due to exposed edge sites. We have calculated the absorption cross-section of the edge sites in the textured single crystal by examining electron micrographs to count the number of edge sites. We derive $5 \times 10^{-14}$ edge sites/$cm^2$, or an absorption cross-section of $5 \times 10^{-17}$ $cm^2$ for a single edge site. This is in very good agreement with the $7 \times 10^{-17}$ $cm^2$ obtained for the platelet materials.

The absorption spectrum of the textured crystal is different from that of the disordered powder, however (FIG. 6). The powder has an absorption which increases with energy, while the platelets and the textured material are relatively flat. This effect is due to disorder in the powder and is well known in other semiconductor materials, see, e.g., G. D. Cody in *Hydrogenated Amorphous Silicon*, ed. by J. Pankove, Academic Press (1984). This effect can be thought of as a defect energy which varies from site to site. Thus, the optical data shows that the lithographic texturing process creates material with a high density of highly ordered edge sites.

This high degree of order can be important in catalytic processes. For example, we showed above (FIG. 4) that the microcrystalline material generated only biphenyl in model catalytic reactions using dibenzothiophene as a feed. The disordered powders, on the other hand, gave cyclohexylbenzene as up to 50% of the total product. This hydrogenated fraction increased in the more disordered material. This shows that the selectivity of $MoS_2$ catalysts is related to their disorder. The textured material we demonstrate here has a much higher density of the active edge sites than conventional single crystals, but retains the crystallinity necessary for high selectivity.

Figure 12:
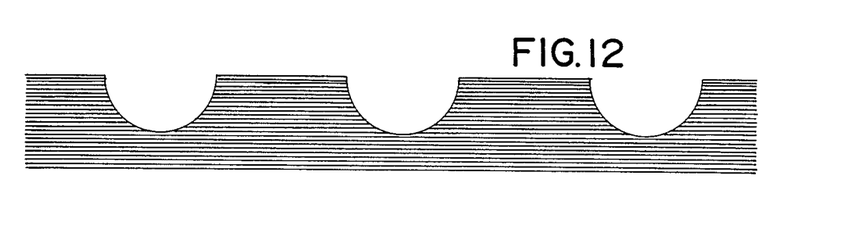
FIG. 12 shows a schematic diagram of an embodiment of the structure wherein the edge sites are exposed by concave pores.

These materials will be useful in a wide variety of catalyst applications. For example, the pore size and shape can be varied to affect selectivity. The geometry in FIG. 12 has a concave pore lined with $MoS_2$ edge sites; this previously unknown structure is ideal for the cracking of heavy molecules which "just fit" into the pore. In this case virtually all the $MoS_2$ surfaces touching the molecule are the catalytically active edge sites with the density of these sites at a maximum.

Using these techniques it is also possible to make pores as small as molecular dimensions (100A). In this case only molecules below a certain size will be able to fit into the pore and react. This provides another physical selectivity mechanism useful for hydrocarbon processing.

IV. Ordering of Edge Sites

Figure 13:
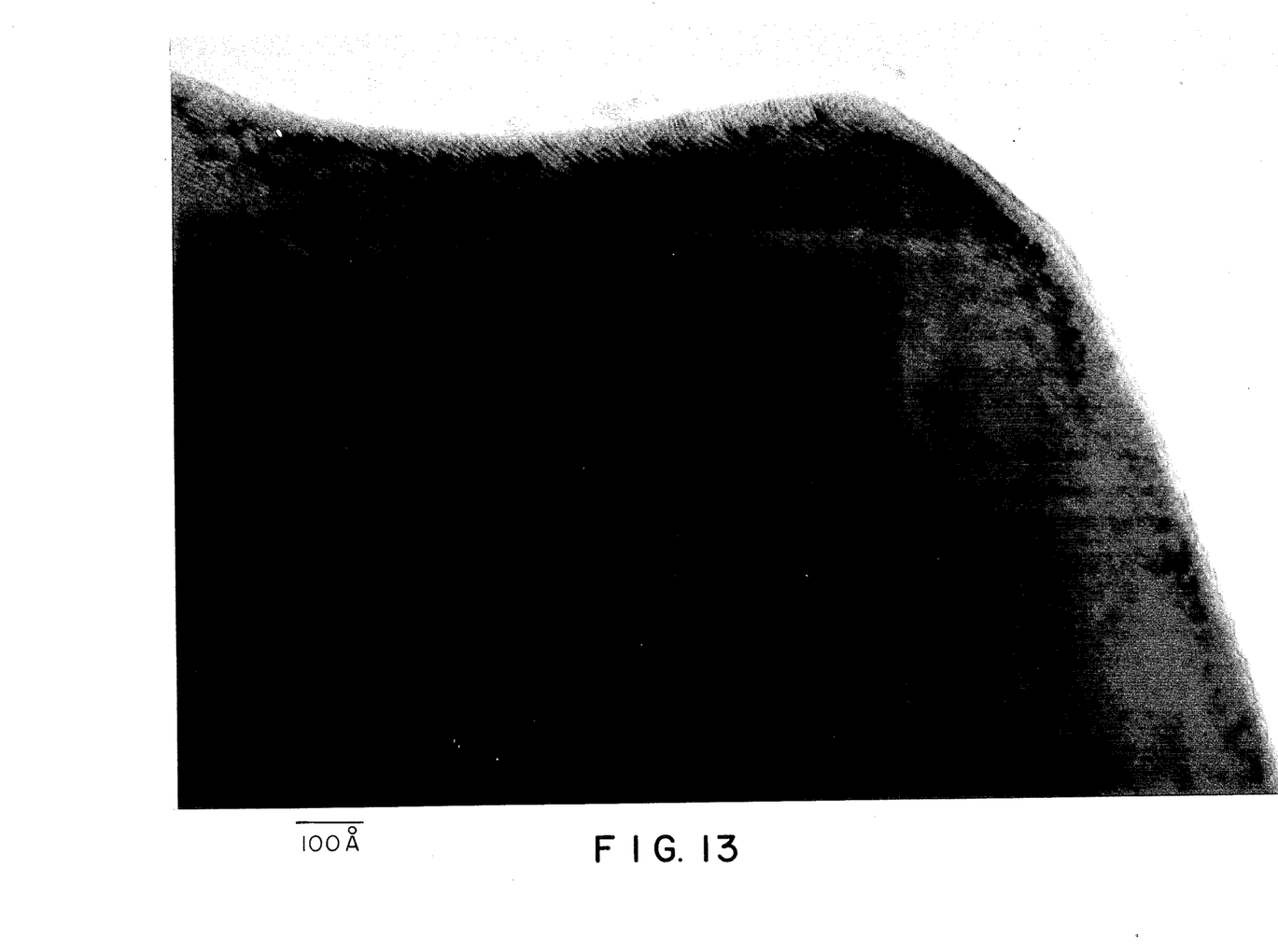
FIG. 13 is a transmission electron micrograph showing perfection layer edges in etched $MoS_2$ posts, with surface oxidation.
Figure 14:
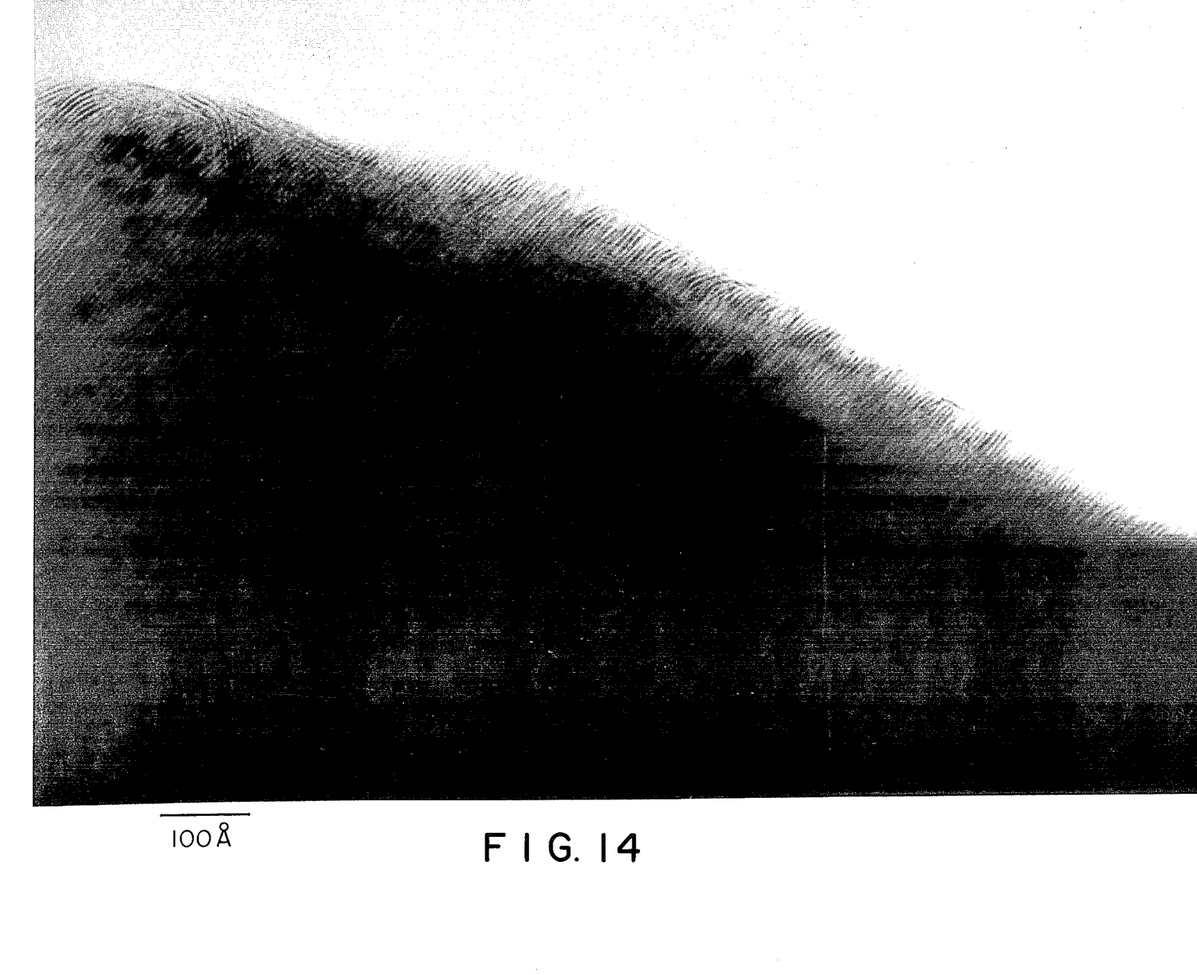
FIG. 14 is a transmission electron micrograph showing edge plane disordering induced by $H_2/H_2S$ treatment.
Figure 15:
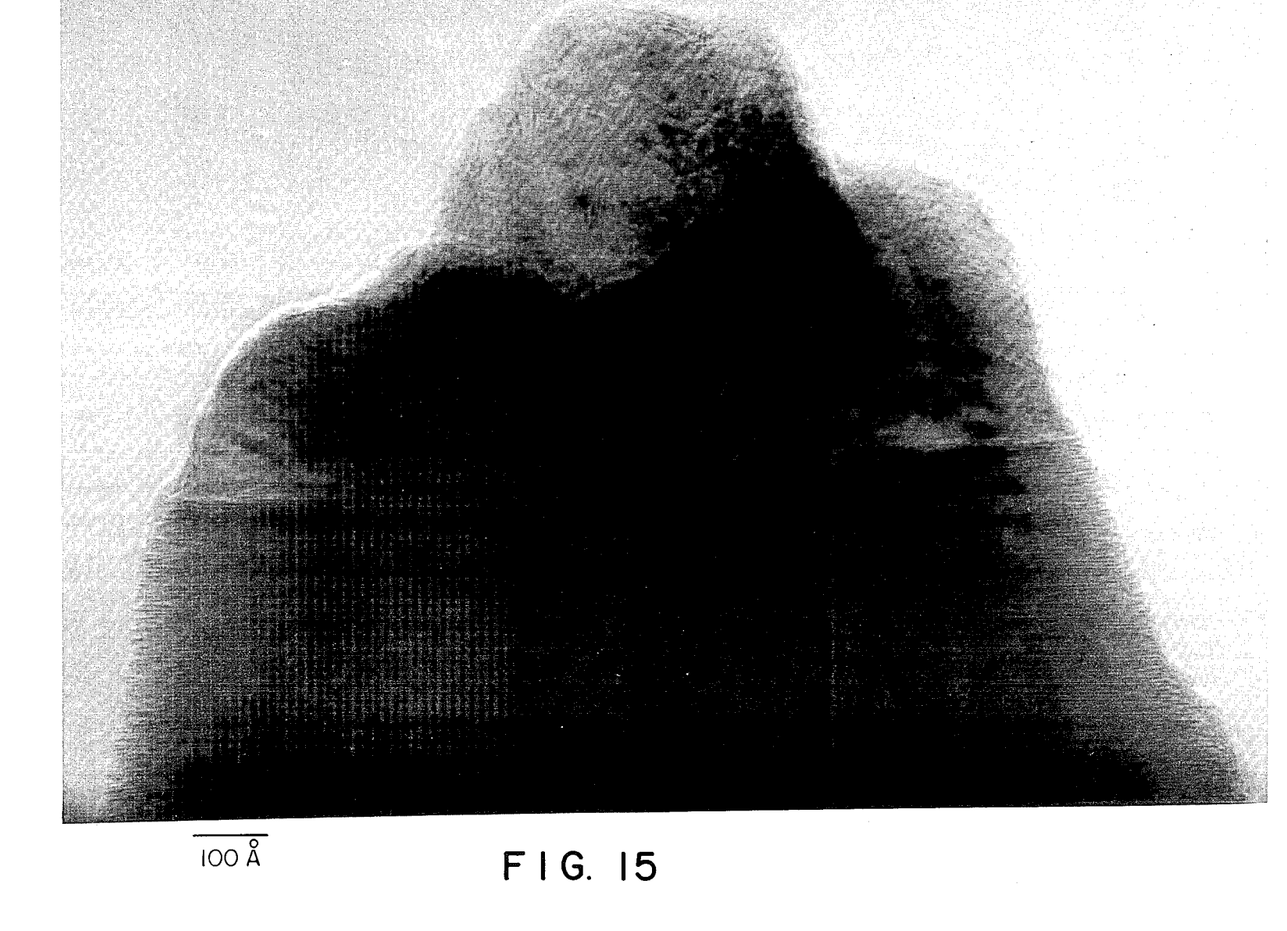
FIG. 15 is a transmission electron micrograph showing disordering induced in top half of post structure by exposing $H_2/H_2S$ treated post to vacuum for 1 hour.

The high degree of organization in the edge sites created in our process is shown in FIG. 13. FIG. 13 is a transmission electron micrograph showing the arrangement of $MoS_2$ layers. The individual layers are flat and uninterrupted across the entire width of the post and angle upwards at surface where they terminate abruptly. The post shown in FIG. 13 was created by covering a flat $MoS_2$ surface with a monolayer of monodisperse polystyrene spheres (0.2 μm diameter). The polystyrene spheres acted as an etchant mask during exposure to a 500 ev 0.3 mA/$cm^2$ argon ion beam that removed material between spheres and left posts of $MoS_2$. Any residual hydrocarbon on the surface was removed with a 500 ev 0.3 mA/$cm^2$ oxygen beam that selectively removed hydrocarbons. This procedure leaves a surface oxide that is removed with a brief $SF_6$ ion milling. Transmission electron microscope examinations of posts prepared in this manner show that $MoS_2$ layers are flat across the entire width of the post and terminate abruptly at the surface. The upward turn of the layers at the post surface shown in FIG. 13 occurs due to prolonged exposure to an oxidizing atmosphere (air). The surface oxide phase causes the upword turn of layers at the post surface. The high degree of order of the edge sites can be selectively altered by subsequent surface treatments. For example, a controlled amount of disorder can be introduced by exposing samples with well ordered edge sites to a $H_2/H_2S$ gas mixture at elevated temperature 350° C.). The $H_2/H_2S$ treatment changes the ordering of the edge sites to that shown in FIG. 14. The transmission electron micrograph shown in FIG. 14 shows flat layers coming to the post edge where they curl up into a rag like structure. The rage like structure at post edges shown in FIG. 14 can often be changed by prolonged exposure to vacuum. When a $H_2/H_2S$ treated post is exposed to vacuum for an extended period of time (1 hr) it often begins to undergo a process similar to exfoliation. FIG. 15 shows a $H_2/H_2S$ treated post exposed to vacuum for (1 hr). The top half of the post has dramatically changed layer ordering. In general a high degree of disorder has been introduced into the exposed layer edges in the top half of the post.

Figure 16:
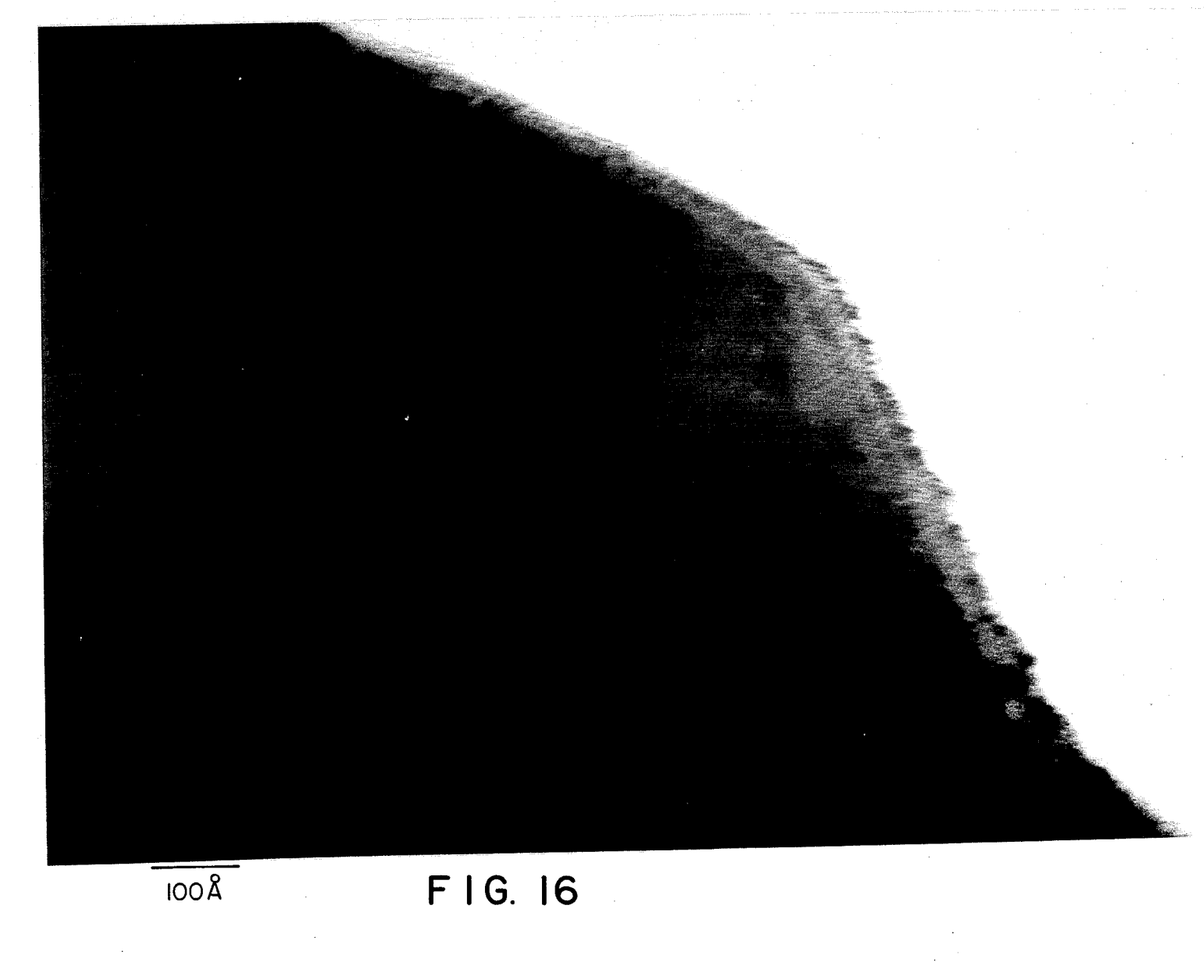
FIG. 16 is a transmission electron micrograph showing steps and kinks introduced at layer edges by HCl treatment.

Besides introducing controlled amounts of disorder into the exposed edge planes, it is possible to utilize surface treatments which alter surface morphology while preserving a high degree of ordering. One such treatment is washing with diluted hydrochlorich acid (HCl). The HCl attacks the edge planes leaving well defined steps and kinks along the post surface. FIG. 16 shows well ordered layers having steps and kinks impressed in them at the post surface.

Figure 17:
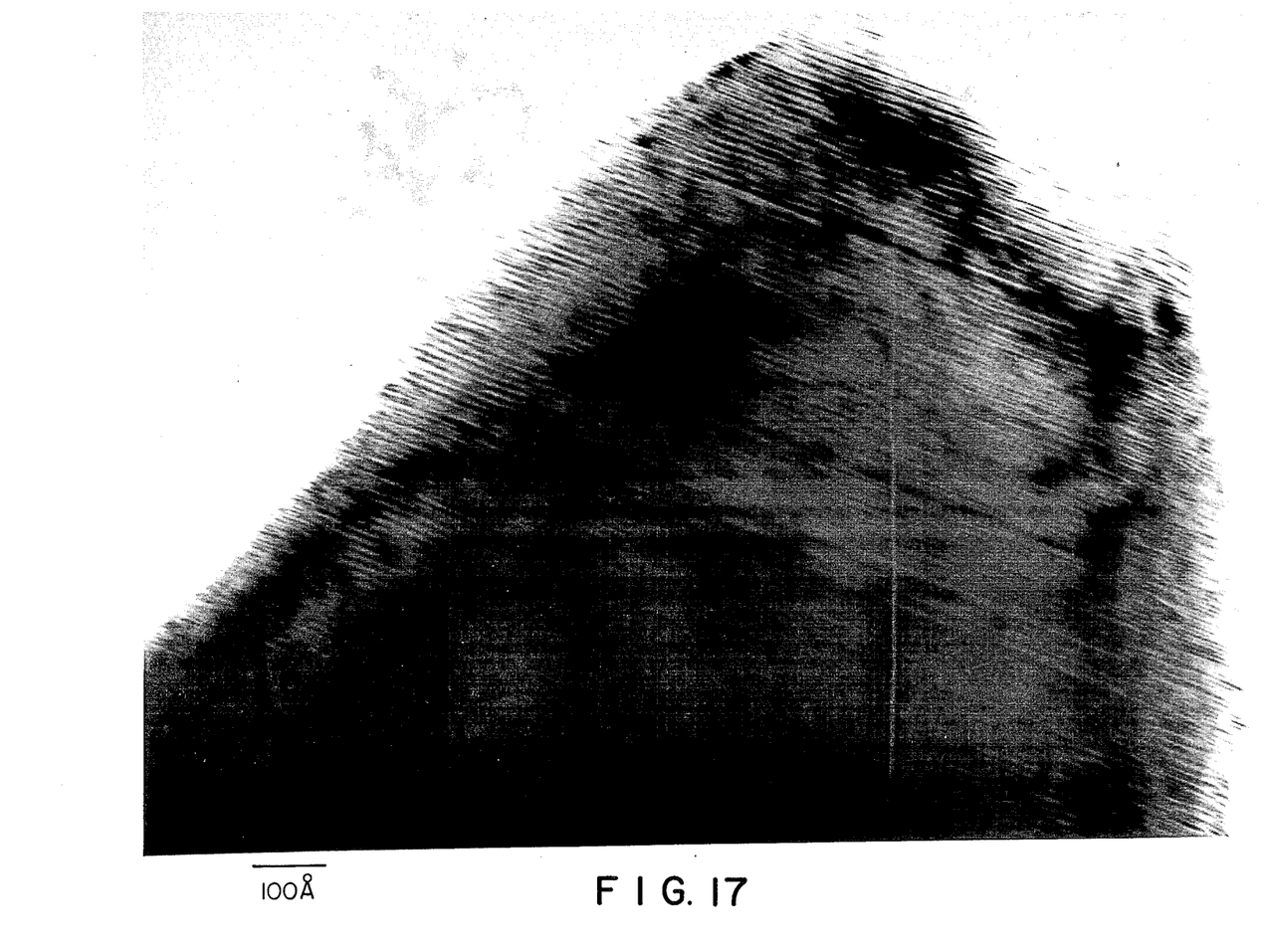
FIG. 17 is a transmission electron micrograph showing steps and kink structure introduced by treating with $NH_4OH$.

An alternative way of producing steps and kinks along the ordered layer edges is to wash the samples with NH4OH. FIG. 17 shows transmission electron micrographs of samples washed with NH4OH.

Figure 18:
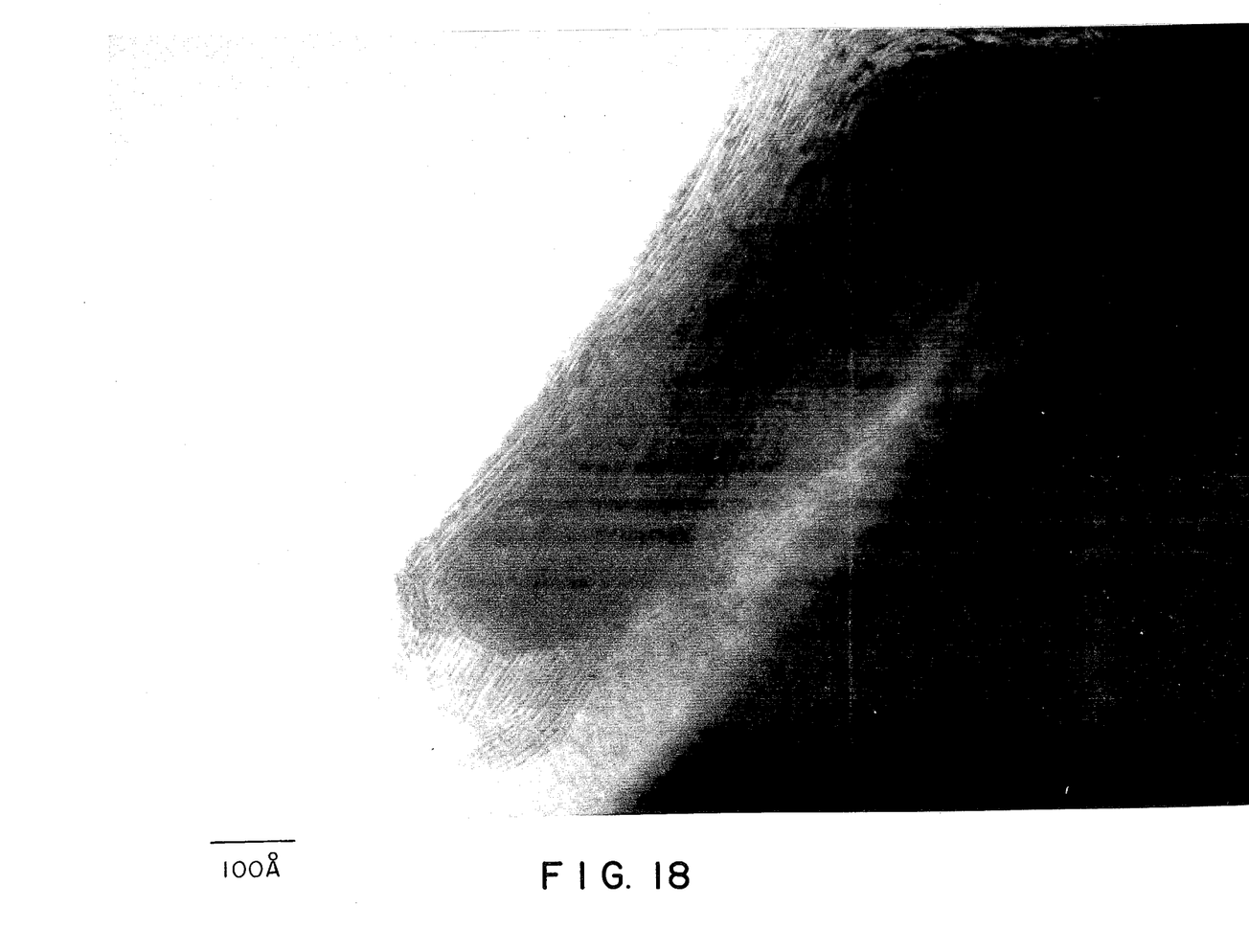
FIG. 18 is a transmission electron micrograph showing layer structure produced by intercolating n-butyllithium.

As a final example of controlled altering of the exposed layer structure we show a post exposed to n-butyl lithium, in FIG. 18. The N-buthyl-lithium intercalated into the post altering the layer ordering.

The examples shown illustrate that layer ordering can be altered in a controlled manner. This is only possible because we start with well ordered layers exposed at the post edge. If the layers were disordered at the post edge, it would not have been possible to exercise this high degree of control of layer ordering. Altering the degree of ordering of layers along the post edge alters the selectivity of the catalytic activity. Thus, by controlling edge site ordering we can tailor the catalytic performance of our artificially textured catalyst. In the examples shown the ordering of the edge planes was controlled by changed from highly ordered to highly disordered.

What is claimed is:

1. A method for increasing the catalytic activity of a layered catalyst of metal chalcogenide crystals comprising (a) increasing the area of edge planes by lithographic patterning using etching, and (b) treating said edge planes by a chemical exposure to $H_2S$ or HCl or intercalation such that said edge planes are arranged in a predetermined manner.

2. The method of claim 1 wherein said etching is natural lithography.

3. The method of claim 1 wherein said metal is a transition metal.

4. The method of claim 1 wherein said metal is molybdenum.

5. The method of claim 1 wherein said chalcogenide is a sulfur.

6. The method of claim 1 wherein said catalyst is $ReS_2$.

7. The method of claim 1 wherein said catalyst is $WS_2$.

8. The method of claim 1 wherein said etching is ion beam milling.

9. The method of claim 1 wherein said etching is plasma etching.

10. The method of claim 1 wherein said etching is reactive ion etching.

* * * * *